United States Patent [19]

Autzen et al.

[11] 4,221,776

[45] Sep. 9, 1980

[54] MANUFACTURE OF ACICULAR FERRIMAGNETIC IRON OXIDES

[75] Inventors: Horst Autzen, Freinsheim; Helmut Jakusch; Eberhard Koester, both of Frankenthal; Werner Loeser, Ludwigshafen; Peter Rudolf, Neuhofen; Wilhelm Sarnecki, Limburgerhof; Werner Steck, Mutterstadt, all of Fed. Rep. of Germany

[73] Assignee: BASF Aktiengesellschaft, Fed. Rep. of Germany

[21] Appl. No.: 6,528

[22] Filed: Jan. 25, 1979

[30] Foreign Application Priority Data

Feb. 10, 1978 [DE]  Fed. Rep. of Germany ....... 2805621

[51] Int. Cl.$^2$ ............................................. C01G 49/06
[52] U.S. Cl. ................................ 423/634; 252/62.56; 423/632
[58] Field of Search .................... 252/62.56; 423/634, 423/632

[56] References Cited

U.S. PATENT DOCUMENTS

| | | | |
|---|---|---|---|
| 2,900,236 | 8/1959 | Speed et al. | 423/634 |
| 3,897,354 | 7/1975 | Woditsch et al. | 252/62.56 X |
| 3,904,540 | 9/1975 | Bennetch et al. | 423/634 X |
| 4,061,725 | 12/1977 | Ohlinger et al. | 423/634 |

FOREIGN PATENT DOCUMENTS

| | | |
|---|---|---|
| 1061760 | 7/1959 | Fed. Rep. of Germany . |
| 39-20939 | 9/1964 | Japan ....................................... 423/634 |
| 675260 | 7/1952 | United Kingdom . |

OTHER PUBLICATIONS

Hamada et al., "Bull. of the Chem. Soc. of Japan", vol. 50(6), pp. 1635–1636, (1977).

*Primary Examiner*—Jack Cooper
*Attorney, Agent, or Firm*—Keil & Witherspoon

[57] ABSTRACT

A process for the manufacture of acicular ferrimagnetic iron oxide by reducing heat-treated acicular iron(III) oxide hydroxide with an organic compound which decomposes in the presence of iron oxide at from 450° to 650° C., followed by at least partial oxidation with an oxygen-containing gas at from 200° to 500° C., wherein the iron(III) oxide hydroxide employed is heat-treated at from 450° to 700° C. and has a surface area, measured by the BET method, of from 10 to 23 m$^2$/g.

2 Claims, No Drawings

MANUFACTURE OF ACICULAR FERRIMAGNETIC IRON OXIDES

The present invention relates to a process for the manufacture of acicular ferrimagnetic iron oxides having a coercive force of more than 28.0 kiloamps/m, by reduction of a heat-treated acicular iron(III) oxide hydroxide with an organic compound which decomposes in the presence of iron oxide at from 450° to 650° C., and at least partial oxidation with an oxygen-containing gas at from 200° to 500° C.

Acicular ferrimagnetic iron oxides, e.g., magnetite and gamma-iron(III) oxide, have long been used extensively as magnetizable materials in the manufacture of magnetic recording media. A large number of processes for the manufacture of gamma-iron(III) oxide, which is the principally used oxide, has been disclosed. For example, British Pat. No. 675,260 describes a process for obtaining gamma-iron(III) oxide in which acicular alpha-iron oxide hydroxide (goethite) is dehydrated to alpha-iron(III) oxide, the latter is converted to magnetite in a reducing atmosphere at above 300° C., and the magnetite is oxidized to acicular gamma-iron(III) oxide in air at below 450° C. In the course of attempts to improve the crystalline, mechanical and magnetic properties of such materials, the individual stages of this process have frequently been varied, as have the starting materials.

Virtually simultaneously with the research leading to the process according to the above British patent, suitable magnetic iron oxides were obtained by the method disclosed in German Pat. No. 801,352, namely by treating a non-magnetic iron oxide with a salt of a short-chain carboxylic acid and then heating the oxide. The magnetite thus obtained can also be converted to gamma-iron(III) oxide by oxidation at 200°-400° C. Subsequently, U.S. Pat. No. 2,900,236 disclosed that all organic compounds which can be decomposed below 540° C., with little formation of tar and ash, are suitable for reducing non-magnetic iron oxides to magnetite. For this purpose, the iron oxide is brought into contact with the gaseous, solid or liquid organic substance and is heated at from 540° to 650° C. Whilst U.S. Pat. No. 2,900,236 states that all organic substances meeting the above requirements may be used for the purpose and specifically mentions wax, starch and oil, German Published Application DAS No. 1,203,656 mentions salts of soluble soaps, precipitated onto the iron oxides, as reducing agents for obtaining magnetite from non-magnetic iron oxides, German Laid-Open Application DOS No. 2,064,804 mentions higher hydrocarbons, higher alcohols and amines, higher fatty acids and their salts, as well as oils, fats and waxes, East German Pat. No. 91,017 mentions long-chain carboxylic acids and their salts, German Published Application DAS No. 1,771,327 mentions aliphatic monocarboxylic acids of 8 to 24 carbon atoms, which may or may not be mixed with morpholine, and Japanese Laid-Open application No. 80,499/1975 mentions organic compounds, e.g. inert gases containing ethanol, for the same purpose. In the above prior art processes, the material is in some cases heated in the absence of air, whereupon the reaction stops at the magnetite stage, and in some cases in the presence of air, whereby the magnetite is directly oxidized to gamma-iron(III) oxide.

Starting materials employed for this conversion of iron oxides by means of organic substances have in the main been the corresponding alpha-modifications, such as alpha-FeOOH or alpha-$Fe_2O_3$, but δ-FeOOH (German Published Application DAS No. 1,203,656) and gamma-FeOOH (German Laid-Open Application DOS No. 2,212,435) have also been employed successfully. If gamma-FeOOH is dehydrated to alpha-$Fe_2O_3$ at an elevated temperature, the product then reduced with hydrogen to $Fe_3O_4$ and the latter reoxidized with air to gamma-$Fe_2O_3$, a decrease in the coercive force of the resulting gamma-$Fe_2O_3$ with increasing dehydration temperature or reduction temperature is observed (Bull. Chem. Soc. Jpn. 50 (6), (1977), 1635).

The above diverse efforts to improve the magnetic iron oxides suitable for the manufacture of magnetic recording media clearly reflect the desire not only to meet, in this way, the rising technical standards which recording media have to meet, but also to compensate for the disadvantages of other magnetic materials which can be employed.

It is an object of the present invention to improve the conventional acicular ferrimagnetic iron oxides and free them from their disadvantages. In particular, it is an object of the invention to provide an acicular gamma-iron(III) oxide which is distinguished by particularly high coercive force and residual induction and by mechanical and magnetic stability.

We have found that this object is achieved and that acicular ferrimagnetic iron oxide having a coercive force greater than 28.0 kiloamps/m, measured at a field strength of 100 kiloamps/m and a tap density of 1.2 g/$cm^3$, and the other required properties can be obtained by reduction of a heat-treated acicular iron(III) oxide hydroxide by means of an organic compound which decomposes in the presence of iron oxide at from 450° to 650° C. and at least partial oxidation with an oxygen-containing gas at from 200° to 500° C., if the acicular iron(III) oxide hydroxide employed has been heat-treated at from 450° to 700° C. and has a surface area, measured by the BET method, of from 10 to 23 $m^2$/g.

Acicular iron(III) oxide hydroxides which consist of lepidocrocite or of a mixture of lepidocrocite and goethite, in which the proportion of lepidocrocite is at least 60%, have proved particularly suitable for the process according to the invention. In particular, it is advantageous to heat-treat the said iron(III) oxide hydroxide at from 450° to 600° C. and to select a material which gives a heat-treated product having a surface area of from 10 to 20 $m^2$/g.

The iron(III) oxide hydroxides consisting of goethite and lepidocrocite contain at least 60%, preferably at least 70%, of lepidocrocite. The goethite:lepidocrocite ratio was in each case determined by X-ray crystallography. The lepidocrocite or lepidocrocite-goethite mixture employed for the process according to the invention can be produced under suitable reaction conditions from iron(II) salt solutions and alkalis, with simultaneous oxidation, for example as described in German PUblished application DAS No. 1,061,760. However, it has proved particularly advntageous to form hydrated iron(III) oxide nuclei, up to an amount of from 25 to 60 mole percent of the iron employed, from an aqueous iron(II) chloride solution by means of an alkali, eg. an alkali metal hydroxide or ammonia, at from 10° to 36° C. whilst stirring vigorously to produce fine air bubbles; the end product is then formed by growth of the nuclei at from 20° to 70° C. and a pH of from 4.0 to 5.8 (obtained by adding further quantities of alkali) with vigorous dispersion of air in the mixture. After completion of growth, the solids content of iron(III) oxide hydroxide in the aqueous suspension should be from 10 to 70 g/l, preferably from 15 to 65 g/l. After filtering off and washing the precipitate, the iron(III) oxide hydroxide obtained is dried at from 60° to 200° C. The surface area of the particles, measured by the BET method, is from 18 to 50 m$^2$/g.

A lepidocrocite, or goethite-lepidocrocite mixture, prepared in this way is, in the process according to the invention, heat-treated at from 450° to 700° C., especially at from 450° to 600° C., before being processed further by conventional methods to give a ferrimagnetic iron oxide. The heat treatment may be carried out either in air or in an inert gas atmosphere. The end product meets the requirements needed to achieve the object of the invention if a heat-treated product which has a surface area, measured by the BET method, of from 10 to 23 m$^2$/g, is employed for the process.

The product obtained after the heat treatment step is converted to acicular ferrimagnetic iron oxide by conventional treatment with an organic substance which decomposes in the presence of iron oxide at from 450° to 650° C.

For this purpose, the heat-treated product is mixed with the organic substance or is coated with the substance in a suitable solution or suspension thereof, and is then heated at from 450° to 650° C. under an inert gas. Organic substances which can be employed for the purposes of the process according to the invention are all compounds stated to be suitable in the prior art, provided they can be decomposed in the presence of iron oxide at from 450° to 650° C. Advantageously, for example, higher fatty acids, their derivatives, their salts, waxes and paraffins are employed for the purpose. Depending on the organic substance used and on the appropriate reaction temperature chosen, the conversion of the heat-treated product to acicular magnetite is complete in from about 1 to 120 minutes.

The acicular magnetite obtained by this reduction reaction is usually oxidized to gamma-iron(III) oxide, advantageously by passing air over the magnetite or by exposing it to oxygen, at from 200° to 500° C.

If, however, the above conversion reaction is not carried out under an inert gas but in the presence of oxygen, for example in the form of air, it is possible to obtain gamma-iron(III) oxide directly if the treatment is carried out at below about 500° C.

The acicular ferrimagnetic iron oxides produced in accordance with the invention, in particular the gamma-iron(III) oxide thus obtainable, differ distinctly from the conventional gamma-iron(III) oxides in respect of their higher coercive force and residual induction which, surprisingly, can be achieved by the process according to the invention. These improvements in the magnetic material also manifest themselves clearly in the magnetic tapes produced with the material.

To produce magnetic coatings, the gamma-iron(III) oxide is dispersed in a polymeric binder. Suitable binders are conventional compounds used for this purpose, for example homopolymers and copolymers of vinyl monomers, polyurethanes, polyesters and the like. The binder is used as a solution in a suitable organic solvent which may or may not contain other additives. The magnetic coatings are applied to rigid or flexible bases, e.g. disks, films and cards.

The Examples which follow illustrate the invention.

The magnetic properties are measured on an oxide sample having a tap density of $D = 1.2$ g/cm$^3$, using a conventional vibrating sample magnetometer at a field strength of 100 kiloamps/m. The coercive force ($H_c$) is given in kiloamps/m and the specific remanence ($M_r/\rho$) and the specific magnetization ($M_m/\rho$) are given in [nTm$^3$/g].

EXAMPLE 1

In a 36 liter kettle, 2 liters of 31.4% strength FeCl$_2$ solution are diluted with 7 liters of water and brought to 26° C. 290 g of NaOH, made up to 4.5 liters with water, are then added in the course of 10 minutes, whilst stirring. Thereafter, 1.4 m$^3$ of air per hour are passed in until the pH has fallen to about 3.0 and an orange suspension of nuclei is formed. The nuclei suspension is heated to 37° C. whilst continuing to stir the mixture and to pass 1.4 m$^3$ of air/h through the reactor. When this temperature has been reached, the pH is kept at 5.0 by running in additional aqueous sodium hydroxide solution, until the reaction is complete. The suspension is filtered and the filter cake is washed with water until the filtrate is chloride-free, and is then dried at 130° C.

The resulting iron oxide hydroxide is a mixture of 97% of lepidocrocite and 3% of goethite and has a specific surface area, measured by the BET method, of 26.9 m$^2$/g.

This goethite-lepidocrocite mixture is heat-treated in air for one hour at 520° C. The resulting product now has a surface area, measured by the BET method, of 13.4 m$^2$/g. Two samples of the product are each mixed with 2.5% by weight of one of the organic reducing agents listed in Table 1 and converted to magnetite under nitrogen, using the conditions shown in Table 1, after which the magnetite is oxidized to gamma-iron(III) oxide in air. The magnetic properties are also shown in Table 1.

COMPARATIVE EXPERIMENT 1

The procedure described in Example 1 is followed except that before conversion and oxidation the goethite-lepidocrocite mixture is heat-treated at a lower temperature, namely 400° C. (Comparative Example 1a) and 425° C. (1b). The reaction conditions and results of the measurements are again shown in Table 1.

TABLE 1

| | | Surface area of the heat-treated product [m$^2$/g] | Reducing temperature [°C.] | Oxidizing temperature [°C.] | Reducing agent | $M_m/\rho$ | $M_r/\rho$ | $H_c$ |
|---|---|---|---|---|---|---|---|---|
| Example 1 | a) | 13.4 | 520 | 280 | paraffin | 78 | 45 | 28.3 |
| | b) | 13.4 | 520 | 280 | stearic acid | 74 | 43 | 28.8 |
| Comparative Experiment 1 | a) | 31.4 | 540 | 280 | stearic acid | 70 | 39 | 25.0 |
| | b) | 27.5 | 520 | 280 | stearic acid | 68 | 39 | 24.0 |

EXAMPLE 2

In further experiments, the goethite-lepidocrocite mixture used in Example 1 was heat-treated at from 500 to 570° C. and reduced with various organic substances, as shown in Table 2, after which the product was oxidized with air. The resulting magnetic properties of the products of the experiments are also shown in Table 2.

COMPARATIVE EXPERIMENT 2

A goethite-lepidocrocite mixture obtained as described in Example 1 is converted under the conditions shown in Table 2, without prior heat treatment. The results are also shown in Table 2.

Table 3

|  | Surface area of the heat-treated product [m$^2$/g] | Reduction temperature [°C.] | Oxidation temperature [°C.] | Reducing agent | $M_m/\rho$ | $M_r/\rho$ | $H_c$ |
| --- | --- | --- | --- | --- | --- | --- | --- |
| Example 3 | 12.6 | 570 | 350 | 2.5% of stearic acid | 73 | 43 | 28.2 |
| Comparative Experiment 3 A | 70 | 520 | 280 | 2.5% of stearic acid | 75 | 40 | 20.6 |
| Comparative Experiment 3 B | 60 | 520 | 280 | 2.5% of stearic acid | 65 | 35 | 21.3 |

Table 2

|  |  | Surface area of the heat-treated product [m$^2$/g] | Reduction temperature [°C.] | Oxidation temperature [°C.] | Reducing agent | $M_m/\rho$ | $M_r/\rho$ | $H_c$ |
| --- | --- | --- | --- | --- | --- | --- | --- | --- |
| Example 2 | a) | 16.9 | 550 | 290 | stearic acid + Zn stearate | 76 | 45 | 28.3 |
|  | b) | 16.9 | 520 | 370 | stearic acid + Zn stearate | 77 | 45 | 28.1 |
|  | c) | 16.9 | 510 | 370 | Na stearate | 77 | 46 | 29.7 |
|  | d) | 16.9 | 520 | 280 | Zn stearate | 74 | 43 | 28.3 |
|  | e) | 16.9 | 520 | 370 | paraffin | 79 | 46 | 28.2 |
|  | f) | 17.3 | 520 | 330 | stearic acid | 73 | 43 | 28.1 |
|  | g) | 17.3 | 520 | 420 | stearic acid | 74 | 43 | 28.2 |
|  | h) | 14.8 | 560 | 280 | stearic acid | 77 | 44 | 28.1 |
|  | i) | 12.3 | 520 | 380 | stearic acid | 76 | 45 | 30.1 |
|  | j) | 12.3 | 520 | 365 | stearic acid | 75 | 45 | 29.6 |
|  | k) | 13.3 | 500 | 280 | stearic acid | 78 | 45 | 29.4 |
| Comparative Experiment 2 | a) | 26.9 | 520 | 370 | paraffin | 74 | 40 | 21.7 |
|  | b) | 26.9 | 520 | 370 | stearic acid | 72 | 39 | 22.2 |

EXAMPLE 3

Following the same procedure as described in Example 1, a mixture of 94% of lepidocrocite and 6% of goethite, having a surface area, measured by the BET method, of 41.2 m$^2$/g, is prepared and is heat-treated for 30 minutes at 600° C. The heat-treated product has a surface area, measured by the BET method, of 12.6 m$^2$/g. It is mixed with 2.5 percent by weight of stearic acid and then reduced to magnetite under nitrogen, using the conditions shown in Table 3, after which the magnetite is oxidized to gamma-Fe$_2$O$_3$ in air. The magnetic properties are shown in Table 3.

COMPARATIVE EXPERIMENT 3

The procedure described in Example 3 is followed, but before the conversion and oxidation the material is heat-treated at 270° C. (Comparative Experiment 3A) and 330° C. (Comparative Experiment 3B). The reaction conditions and results of the measurements are shown in Table 3.

EXAMPLE 4

A mixture of 71% of lepidocrocite and 29% of goethite, which has a surface area, measured by the BET method, of 27.4 m$^2$/g, and which has been prepared as described in Example 1, is heat-treated for 30 minutes at 520° C. The surface area of the heat-treated product is 21.5 m$^2$/g. The product is mixed with 2.5% by weight of stearic acid and converted to gamma-Fe$_2$O$_3$ under the conditions shown in Table 4. The magnetic properties are also shown in Table 4.

TABLE 4

| Reduction temperature [°C.] | Oxidation temperature [°C.] | $M_m/\rho$ | $M_r/\rho$ | $H_c$ |
| --- | --- | --- | --- | --- |
| 500 | 280 | 75 | 41 | 28.3 |

EXAMPLE 5

A lepidocrocite which is pure according to roentgenography, has a surface area, measured by the BET method, of 31.9 m$^2$/g and has been prepared as described in Example 1 is heat-treated for 30 minutes at 600° C. and then mixed with 1.5% by weight of stearic acid, 1.5% by weight of Zn stearate and 0.75% by weight of dodecylbenzenesulfonic acid, after which it is converted to gamma-Fe$_2$O$_3$ under the conditions shown in Table 5. The process data and the results are shown in Table 5.

COMPARATIVE EXPERIMENT 4

A lepidocrocite as used in Example 5 is heat-treated for one hour at 350° C. The surface area, measured by the BET method, is 37.9 m²/g. The heat-treated product is then converted as described in Example 5. The results are shown in Table 5.

mm wide. The electroacoustic measurements are carried out as described in DIN 45,512, Part 2. Table 6 shows the results of the measurements.

TABLE 6

| Reduction temperature [°C.] | Oxidation temperature [°C.] | Magnetic properties | | | Magnetic properties of tape | | | Electroacoustic data at 4.75 cm/sec | |
|---|---|---|---|---|---|---|---|---|---|
| | | $M_m/\rho$ | $M_r/\rho$ | $H_c$ | $H_c$ | $M_r$ [mT] | Coating thickness µm | $A_H$ [db] | RGA [db] |
| 520 | 350 | 73 | 42 | 29.7 | 27.6 | 140 | 4.4 | +1.6 | +1.0 |

$A_H$ = maximum output level at short wavelengths
RGA = reference level-to-noise ratio

TABLE 5

| | Surface area of the heat-treated product [m²/g] | Reduction temperature [°C.] | Oxidation temperature [°C.] | $M_m/\rho$ | $M_r/\rho$ | $H_c$ |
|---|---|---|---|---|---|---|
| Example 5 | 13.0 | 540 | 350 | 79 | 43 | 28.2 |
| Comparative Experiment 4 | 37.9 | 540 | 350 | 72 | 38 | 22.0 |

EXAMPLE 6

A mixture of 88% of lepidocrocite and 12% of goethite, having a specific surface area, measured by the BET method, of 23.5 m²/g, is prepared as described in Example 1. The pigment is then heat-treated for 30 minutes at 600° C. The resulting product has a surface area, measured by the BET method, of 13.8 m²/g. The product is mixed with 3.5% by weight of zinc stearate and converted to gamma-Fe₂O₃ under the conditions shown in Table 6. This gamma-iron(III) oxide sample is used to prepare a magnetic pigment dispersion, with which a magnetic tape is subsequently produced. To produce the magnetic dispersion, a tube mill is charged with 8,000 parts of steel balls of 5 mm diameter and thereafter 700 parts of the magnetic material, 420 parts of a mixture of equal parts of tetrahydrofuran and dioxane, 8.75 parts of lecithin, 8.75 parts of a neutral polyaminoamide salt and 210 parts of a 20% strength solution of a copolymer of 80% of vinyl chloride, 10% of dimethyl maleate and 10% of diethyl maleate in a mixture of equal parts of tetrahydrofuran and dioxane are introduced. The mixture is dispersed for 40 hours. 1,090 parts of a 10% strength solution of a thermoplastic polyurethane, produced from adipic acid, 1,4-butanediol and 4,4'-diisocyanatodiphenylmethane, in a mixture of equal parts of tetrahydrofuran and dioxane are then added, as well as 0.7 part of polydimethylsiloxane. After dispersing for a further 5 hours, the magnetic dispersion obtained is filtered under pressure through a filter of 5 µm pore size. A 6 µm thick polyethylene terephthalate film is then coated with the magnetic dispersion in the conventional manner by means of a knife coater, and after passing through a magnetic field, the coating is dried at from 60° to 100° C. After drying, the thickness of the magnetic coating on the film is 4.4 µm. The coating is calendered by passing the coated film between heated rollers at 80° C. under a nip pressure of 3 kg/cm. The coated film is cut into tapes 3.81

We claim:

1. A process for the manufacture of acicular ferrimagnetic iron oxide which comprises:
   (a) Heating acicular particles of synthetic lepidocrocite or a mixture of lepidocrocite and goethite containing at least 60% lepidocrocite in air or in an inert gas atmosphere and at a temperature in the range of 450° to 600° C. for a time sufficient to produce acicular particles having a surface area, measured by the BET method, of from 10 to 20 m²/g;
   (b) Reducing the resulting acicular particles to acicular magnetite particles by heating the same at a temperature in the range of 450° to 650° C. under an inert gas and in contact with an organic reducing compound which decomposes at said reducing temperature in the presence of iron oxide; and
   (c) oxidizing the resulting magnetite particles at a temperature in the range of 200° to 500° C. and in the presence of air to convert said magnetite particles into acicular ferrimagnetic gamma-ferric oxide particles having a coercive force greater than 28.0 kiloamps/m, measured at a field strength of 100 kiloamps/m and a tap density of 1.2 g/cm³.

2. A process for the manufacture of acicular ferrimagnetic iron oxide which comprises:
   (a) Heating acicular particles of synthetic lepidocrocite or a mixture of lepidocrocite and goethite containing at least 60% lepidocrocite in air or in an inert gas atmosphere and at a temperature in the range of 450° to 600° C. for a time sufficient to produce acicular particles having a surface area, measured by the BET method, of from 10 to 20 m²/g; and
   (b) converting the resulting particles to acicular ferrimagnetic gamma-ferric oxide particles having a coercive force greater than 28.0 kiloamps/m, measured at a field strength of 100 kiloamps/m and a tap density of 1.2 g/cm³, by heating said particles in air, at a temperature below about 500° C. and in contact with an organic reducing compound which decomposes at said temperature.

* * * * *